United States Patent

Gillard

[15] 3,701,134

[45] Oct. 24, 1972

[54] HIGH DENSITY AND HIGH FREQUENCY DIGITAL RECORDING USING ELONGATED BITS TO OVERCOME THE EFFECTS OF TAPE DROUPOUTS

[72] Inventor: Paul O. Gillard, Salisbury, Australia

[73] Assignee: The Commonwealth of Australia Care of the Secretary, Melbourne, Victoria, Australia

[22] Filed: Nov. 27, 1970

[21] Appl. No.: 93,441

Related U.S. Application Data

[63] Continuation of Ser. No. 659,732, Aug. 10, 1967, abandoned.

[30] Foreign Application Priority Data

Aug. 1, 1966 Australia ....................9550/66

[52] U.S. Cl. ..........................................340/174.1 G

[51] Int. Cl. ..............................................G11b 5/06

[58] Field of Search .......325/39, 40, 143; 179/15 FD

[56] References Cited

UNITED STATES PATENTS

| | | | |
|---|---|---|---|
| 2,662,933 | 12/1953 | Singer | 179/15 FD |
| 2,909,596 | 10/1959 | Fay | 179/15 FD |
| 2,892,886 | 6/1959 | Johnson | 179/15 FD |
| 3,349,182 | 10/1967 | Sblkehiro et al. | 325/39 |
| 2,705,795 | 4/1955 | Fisk et al. | 325/40 |
| 3,518,648 | 6/1970 | Norris | 340/174.1 G |
| 3,569,948 | 3/1971 | Norris | 340/174.1 G |
| 3,412,214 | 11/1968 | Gabor | 340/174.1 G |

OTHER PUBLICATIONS

High Density Binary Recording Using Nonsaturation Techniques by Emil Hopner, IEEE Transactions on Electronic Computers, June 1964.

*Primary Examiner*—Vincent P. Canney
*Attorney*—Waters, Roditi, Schwartz & Nissen

[57] ABSTRACT

High density and high frequency digital recording in which groups of the serial bits are coded and paralleled and simultaneously recorded on a given magnetic or other track so that each bit is lengthened by a factor up to the number of paralleled bits, and on play back each bit is separated from each other bit by use of a decoding process and if necessary rearranged in serial format.

12 Claims, 4 Drawing Figures

Figure 1:
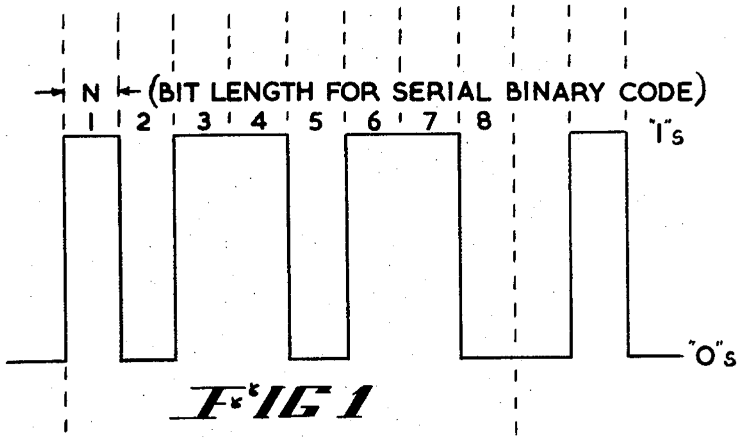

HIGH DENSITY AND HIGH FREQUENCY DIGITAL RECORDING USING ELONGATED BITS TO OVERCOME THE EFFECTS OF TAPE DROPOUTS

This application is a continuation of Ser. No. 659,732, now abandoned.

This invention relates to methods of achieving high density and high frequency digital recording.

It will be known that in high density digital recording according to the currently available techniques, such recordings are limited by the duration of the magnetic tape dropout, and the present method of development generally reported in the literature is based on improvements to the quality of the magnetic tape, the recording and replay heads and the tape transport mechanism.

The recording density at present used in computing equipment varies from 200 bits/inch to approximately 3,000 bits/inch on each track of the magnetic tape, the latter being obtained by using error correction coding to reduce the significance of tape dropouts. Obviously it is highly desirable with modern techniques to achieve very much higher figures than this and it would be advantageous to obtain densities as high as for example 10,000 or 20,000 bits/inch and limited only by the inherent bandwidth and noise of the recording medium which therefore it is the object of this invention to achieve.

One of the principal causes of dropouts is, as stated above, the lack of quality in magnetic tapes as well as limitations applied by the recording and replay heads and the problem of keeping the tape transport system at high efficiency, and while refinements are possible to the mechanical and physical functions for the purpose of reducing dropouts, it will also be obvious that a system different from that used at present would have to be resorted to if maximum densities, up to the bandwidth and noise limitations of the system, are to be achieved. It is the object of this invention therefore to provide such an improved system. According to my invention this is achieved by using on each track of the tape a lengthened bit signal in connection with the simultaneous recording of N bits on the one track.

According to this invention therefore the system proposed is based on the principle that if N bit data is coded and recorded simultaneously on a given track, each bit being lengthened by up to a factor N compared with the equivalent serial bit length, a high bit density can be used with a very low probability that the lengthened bits will be affected by tape dropout. On the occurrence of a tape dropout there is an insignificant degradation of each of N bits, instead of the serious degradation of one or a few bits as with the currently available technique, so that by using this principle, recording densities approaching the bandwidth and noise limitations of the record reproduce system can be used with very low probability of data dropouts.

We have found that conventional recording equipment operating on this principle is capable of a recording bit density of at least 12,000 bit/inch/track with an error probability of approximately 1 in $10^8$, the limiting factors being signal to noise ratio and bandwidth rather than the effect of tape dropout.

Figure 2:
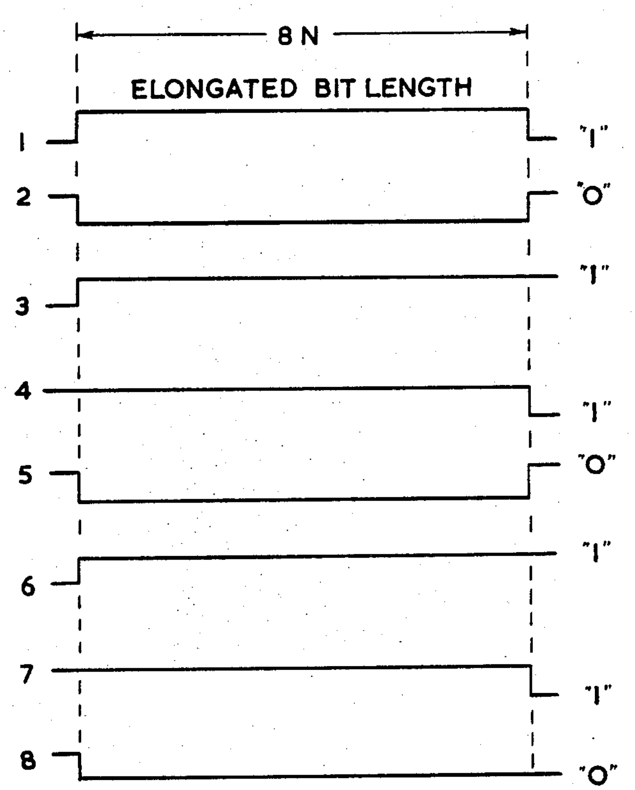

The principle in general is illustrated in the accompanying illustrations in which FIG. 1 shows how eight bits of binary coded data are normally recorded sequentially while in FIG. 2 is shown how the same data would be recorded under the present inventions from which it is to be noted that the eight bits of binary coded data are now placed into parallel relationship and each bit is elongated to the value eight times the duration of a discrete serial bit.

Figure 3:
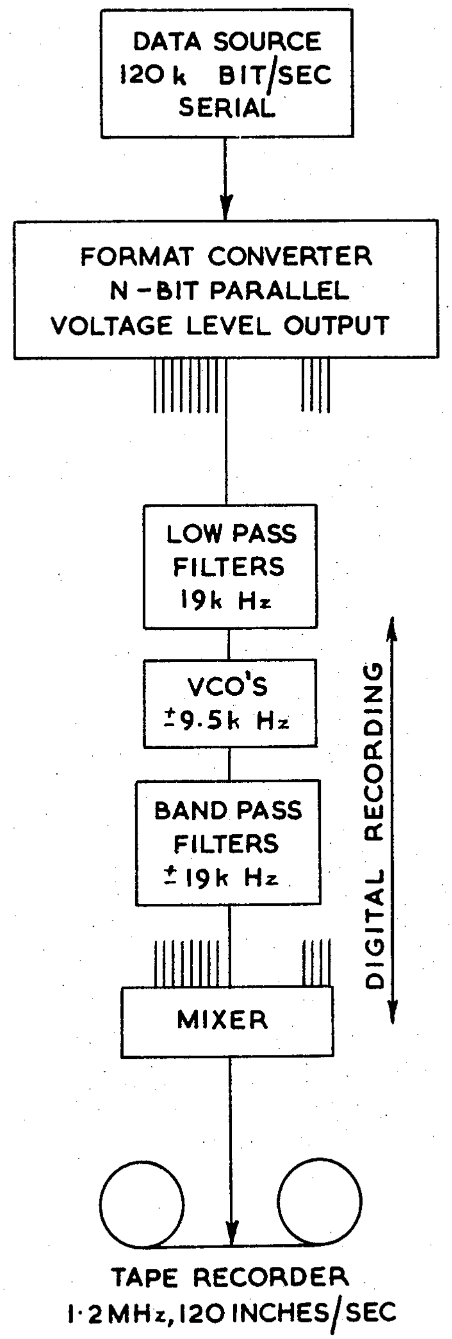
Figure 4:
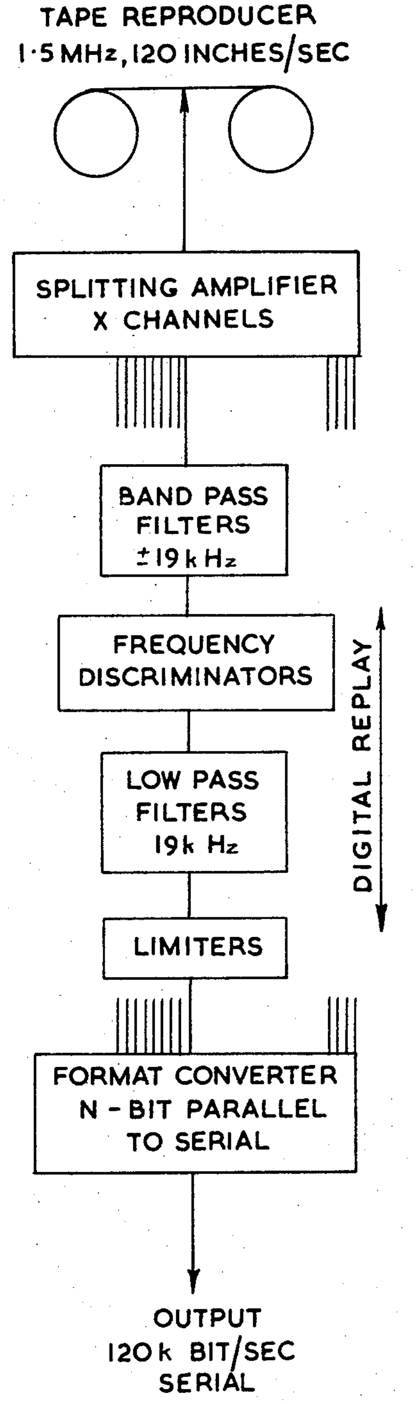

FIGS. 3 and 4 respectively show schematically a digital recording unit and a digital replay unit which would make up such a system.

The following are three techniques which could be used as methods of obtaining the advantages offered by this invention:

FIRST METHOD

Binary data in serial format is converted to N bit parallel format, if not already in parallel format, each bit-channel then frequency modulating one of N carriers using Frequency Shift modulation as the method of coding, the frequency allocations of the carriers being such as to allow to each carrier a bandwidth equal to the reciprocal of the bit-length, with guardbands included to allow for filtering of the carriers to reduce mutual interference. The modulated carriers are band-pass filtered, added linearly and recorded linearly on the one track of tape, the relative amplitudes being such that the replay signal to noise ratio in each channel is equal, taking account of the non-uniform noise spectrum of the recording process. On replay each carrier is separated by filtering and is frequency discriminated, the output data being converted from N bit-parallel back to serial format, if required.

An example of this application of our invention is described below, and is illustrated in FIGS. 3 and 4. In this example, data may for instance be recorded at a density of 10,000 bit/inch on one track of a tape recorder operating with a tape speed of 120 in/sec and a bandwidth of 1.5 MHz, such machines being currently available commercially. With an overall rms signal to rms noise ratio of 23 dB, which current technique achieves or betters, a bit error rate of 1 in $10^8$ is obtained. Data in a serial format with a bit rate of 120,000 bit/second is converted to a 32 bit NRZ parallel format, and each of the 32 bit trains is low-pass filtered to a bandwidth of 19 KHz. Each filtered bit train then frequency modulates a voltage-controlled oscillator by $\pm 9.5$ KHz peak about its nominal center frequency, the carrier frequencies being at 47 KHz intervals from 23 KHz to 1,480 KHz inclusive. The carriers are each band-pass filtered to $\pm 19$ KHz about their center frequencies, allowing 9 KHz guard band between channels. The carriers are linearly mixed together, the amplitudes being in direct proportion to the noise power density in the record-reproduce system at the carrier frequencies. The mixed signal is recorded at a level 22 dB below the 2 percent distortion level for a sinusoid as indicated on an average reading volt-meter, to give a low probability of clipping on peak signals.

On replay at 120 in/sec. the carriers are separated by band-pass filtering and are detected using pulse averaging discriminators, whose outputs are low-pass filtered to reduce carrier components and then voltage limited to produce 32 rectangular wave trains. The parallel data so obtained is converted back to a 120,000 bit/sec. serial format at the output of the system.

SECOND METHOD

The N bit-channels of an N bit parallel format data train, each modulate one of N carrier waves using phase reversal modulation, the carriers being phase coherent, and the frequency spacing being uniform and somewhat greater than the reciprocal of the shortest bit-length to allow for guard-bands between channels for mutual interference filtering. The modulated and filtered signals and a pilot-tone reference signal are then linearly added together and linearly recorded on one track of tape, the relative amplitudes being such that on replay the signal to noise ratio in each channel is equal, taking account of the non-uniform noise spectrum of the recording process. On replay each channel is demodulated using coherent detection, the reinserted play back carriers being phase-locked to the pilot tone. The output data appears in N binary data channels.

THIRD METHOD

Binary data in a serial format is converted to a series of positive and negative impulses, which is passed through a dispersive filter network whose group delay is a function of frequency such that the output signal corresponding to each bit of data has N times the duration of the original bit. There is thus at the output of the dispersive filter a signal which at any instant of time contains simultaneously the frequency components of N successive bits. This signal is passed through an amplitude equalizing network which has an amplitude response which is the inverse of the signal-noise power density of the recording system, which signal is linearly recorded on a track of magnetic tape. On replay the signal is passed firstly through a network which has the inverse phase and amplitude response of the amplitude equalizing network, and then through a network with the inverse frequency-delay characteristics of that of the recording filter, allowance being made in the system design for tape transport flutter, if necessary. The original binary pulse train is recovered by the collapsing in time of the recorded signal.

Thus it is seen that unless the data is already in the appropriate format, methods 1 and 2 require the data to be converted to N channel parallel format while Method 3 requires the data to be converted to single channel serial format.

The obvious result of this invention is that the present limits of digital recording have been considerably bettered because, firstly the effect of tape dropouts no longer limits the bit density per track, and secondly the effect of tape skew, which is normally a critical factor and reduces the maximum tape width and hence the number of heads which can be used simultaneously, has been reduced by a factor N. It follows that a considerable economy in tape length and width may be achieved, only a few tracks being required to obtain a long word length, and for a given bit rate it is possible to use a very much reduced tape speed and thus to obtain good stop-start and wear characteristics.

It will be obvious that various types of recorders can be used such as a transverse or oblique scanning rotating head type of recorder, which may be suitably modified for rapid stop-start control of tape speed if required. The invention is intended to include the use of a number of such tracks, and the facility for repeated replay of a group of data while the tape is stationary.

The previously stated parallel or serial formats may be used for records, the individual bits being lengthened by a factor N and recorded either in parallel or in time sequences but overlapping, according to methods such as those described above.

Buy utilizing these techniques the rotating head recording equipment, operating at a head-to-tape velocity of for example 1,500 inches/second would now be capable of recording and reproducing data at a rate of some 20 mega bit/second/track, or 40 mega bit/second for a two track recording system.

The principle outlined has wide scale application to very high speed digital computing whereby advantage is taken of the ability to record and replay long data words at high speed with a rapid stop-start and repeated replay capability, and to continuous and intermittent wide-band data transmission systems, particularly those using propagation by reflection from meteor trails.

The principle outlined is also applicable to recording systems which use media other than magnetic tape, such as plastic film, as the medium for recording, in order to overcome problems associated with drop-out or to achieve other advantages of this principle particularly the reduction in the effect of tape skew.

I claim:

1. The method of high density and high frequency digital recording in which N bits of data have each bit arranged in a coded form and recorded in overlapping relation on a given track, said method comprising elongating each bit by a factor up to N compared with the equivalent serial bit length and subsequently separating each bit from the other bits by the use of a decoding process, shortening the bits and rearranging them in serial format.

2. The method according to claim 1 in which N bits of serial data are first converted to N bits of parallel discriminatable data and recorded, and are subsequently converted back to serial data on playback.

3. The method according to claim 1 wherein coding of each lengthened bit data is by frequency modulating.

4. The method according to claim 1 wherein the N bit serial data has each bit differently coded by frequency modulation and passed through limiting filters for correct bandwidth selection and the thus modulated bits are then mixed and recorded on a single tape track.

5. The method according to claim 1 wherein the N bit data has each bit differently frequency modulated for coding and the thus modulated bits are mixed together and recorded on a single tape track, and wherein on play back of the tape the signal is passed through frequency selecting filters or circuits for separation from each other of the N bits.

6. The method according to claim 5 wherein the N bits are initially of serial format and are first converted to N bits of parallel discriminatable data and wherein on playback the separated N bits are fed to a format converter to reinstate the N bit parallel format to serial format.

7. The method according to claim 1 wherein the N bit-channels of an N bit parallel format data train each modulate one of N carrier waves using phase reversal modulation, the carriers being phase coherent and the frequency spacing being substantially uniform and somewhat greater than the reciprocal of the shortest bit-length, to allow for guard-bands between channels for mutual interference filtering, and then linearly adding the modulated and filtered signals and recording the same on one track of a tape.

8. The method according to claim 7 comprising adding a pilot tone on the recording as a reference signal.

9. The method according to claim 7 in which replay is effected by demodulating each channel using coherent detection whereby the output data appears in N binary data channels.

10. The method according to claim 7 in which a pilot tone is added to the recording as a reference signal and replay is effected by demodulating each channel using coherent detection, the play back carriers being phase locked to the pilot tone, whereby the output data appears in N binary data channels.

11. The method according to claim 1 wherein the data in the form to be recorded is passed through an amplitude equalizing network with an amplitude/frequency response proportioned to the noise power density of the recording medium, in order to obtain on replay a uniform signal to noise/frequency characteristic.

12. Apparatus for recording N serial data bits consisting of:

means to convert said N serial data bits to a parallel format;

means to expand each of said N serial data bits by a factor of N after said N serial bits have been converted to a parallel format;

means for selecting a center frequency plus a deviation for each of said N serial data bits wherein each of said center frequencies are different from the remainder of said center frequencies and wherein said deviation is selected so as to be either additive or subtractive as a function of the information content of the particular bit;

means for combining each of said center frequencies plus a deviation so as to generate a single signal which is representative of the original information content;

and means for recording said single signal.

* * * * *

UNITED STATES PATENT OFFICE

CERTIFICATE OF CORRECTION

Patent No. 3,701,134 Dated October 24, 1972

Inventor(s) Paul O. Gillard

It is certified that error appears in the above-identified patent and that said Letters Patent are hereby corrected as shown below:

On the cover sheet [30], "Aug. 1, 1966" should read -- Aug. 11, 1966 -- .

Signed and sealed this 20th day of March 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334